United States Patent [19]
Williams

[11] Patent Number: 6,151,630
[45] Date of Patent: Nov. 21, 2000

[54] NON-REDUNDANT BROWSING OF A SEQUENCING OF WEB PAGES

[75] Inventor: Marvin L. Williams, Hickory Creek, Tex.

[73] Assignee: Avaya Technology Corp., Miami Lakes, Fla.

[21] Appl. No.: 09/079,484

[22] Filed: May 15, 1998

[51] Int. Cl.$^7$ ............................ G06F 15/16; G06F 17/30
[52] U.S. Cl. .......................... 709/229; 709/203; 709/217; 709/227; 709/228; 701/1; 701/500; 345/344; 345/357
[58] Field of Search ........................... 709/200, 202–203, 709/217–219, 227–229, 231–233; 707/101–102, 500–501, 512–514, 1, 5; 345/340, 344, 353, 356–357

[56] References Cited

U.S. PATENT DOCUMENTS

| | | | |
|---|---|---|---|
| 4,768,144 | 8/1988 | Winter et al. | 707/1 |
| 5,485,609 | 1/1996 | Vitter et al. | 707/101 |
| 5,586,245 | 12/1996 | Sugai et al. | 345/344 |
| 5,715,445 | 2/1998 | Wolfe | 707/5 |
| 5,727,129 | 3/1998 | Barrett et al. | 709/217 |
| 5,752,243 | 5/1998 | Reiter et al. | 707/3 |
| 5,764,227 | 6/1998 | Ishimine | 345/344 |
| 5,826,031 | 10/1998 | Nielsen | 709/233 |
| 5,937,163 | 8/1999 | Lee et al. | 709/218 |

OTHER PUBLICATIONS

A. Salahshour & M. L. Williams, Bidirectional Session Context Guidance Mechanism, IBM Technical Disclosure Bulletin, vol. 37, No. 02B, Feb. 1994, pp. 675–676.

*Primary Examiner*—Ahmad F. Matar
*Assistant Examiner*—Bharat Barot
*Attorney, Agent, or Firm*—David Volejnicek

[57] ABSTRACT

A method, an apparatus, and a computer-readable programmed medium that facilitate browsing through an ordered sequence (108, 109) of World Wide Web pages (107) by automatically skipping over, or bypassing, previously viewed pages whenever the user requests a "Next Page" or a "Previous Page". A page owner creates a sequence by defining for each page in the sequence a page record (200) that specifies the page's URL (205), its sequential index value (210), an unviewed flag (220), and optionally page-descriptive information (230). Upon starting a session with a Web server (102), each user is given a copy of all page records. Each time a user requests access to any page by specifying its URL, the unviewed flag of the user's copy of that pages record is set to a viewed state. Each time a user requests access to any page by specifying a "Next Page" or a "Previous Page", the user's copy of the page records is used to find the first subsequent page or the first previous page, respectively, in the sequence to the page that is presently viewed by the user, whose unviewed flag is in the unviewed state, the state of the flag is changed to the viewed state, and the user is given access to this yet-unviewed page. At the end of each session, the page record copies that correspond to the session are deleted.

19 Claims, 9 Drawing Sheets

NON-REDUNDANT BROWSING OF A SEQUENCING OF WEB PAGES

TECHNICAL FIELD

This invention pertains to data-retrieval systems in general, and to the World Wide Web in particular.

BACKGROUND OF THE INVENTION

State-of-the-art Web browsers allow a user to dynamically link to (view) other Web pages from a presently-viewed page by selecting and activating (clicking on) hypertext tags of those other pages which are embedded in the presently-viewed page. The creator of these pages often allows a user to link to any individual page via a plurality of different paths. For example, tags embedded in a "home page" may allow a user to directly link to "page 1", "page 2", and "page 3", while a tag embedded in "page 1" may allow the user to link to "page 2" and a tag embedded in "page 2" may allow the user to link to "page 3". In other words, the pages in this example may be viewed either randomly or sequentially. For sequential viewing, a "Next Page" tag is often employed, as opposed to a tag that explicitly and uniquely specifies a particular page.

A disadvantage of using the "Next Page" tag becomes apparent when the user has already linked to (viewed) one or more of the sequential pages in a non-sequential manner—for example, if the user has already linked directly to "page 2" from the "home page", but now clicks on the "Next Page" tag in "page 1". The disadvantage is that clicking on the "Next Page" tag will link the user to a page which he or she has already viewed ("page 2"), whereas what the user really desires is to be linked to the next page that he or she has not yet viewed ("page 3").

Existing systems usually will highlight a tag linking to a page that has already been viewed by the user in order to indicate to the user that he or she has already viewed that page. But this indication is purely informational and does not prevent redundancy of page viewing from occurring. Existing systems do not allow the user to skip a "next page" dynamically, based upon whether or not the user has already viewed that page.

SUMMARY OF THE INVENTION

This invention is directed to solving these and other problems and disadvantages of the prior art.

Generally according to the invention, there is provided a method, an apparatus, and a computer-readable programmed medium that facilitate browsing through an ordered sequence of a plurality of pages of information in a manner that automatically bypasses, skips over, previously-viewed (accessed) pages in the sequence. Specifically, in response to receipt from a user of a request for a "next page" in the sequence while the user is accessing some individual page in the sequence, the user is given access to a first page subsequent in the ordered sequence to the individual page that has not yet been accessed by the user. Preferably, the invention is applied to both the forward and the reverse directions of browsing the sequence. Namely, in response to receipt from a user of a request for a "previous page" in the ordered sequence while the user is accessing some individual page in the sequence, the user is given access to a first page preceding the individual page in the sequence that has not yet been accessed by the user.

Advantageously, the invention does not interfere with or change the conventional way of accessing particular pages by uniquely identifying them (e.g., by specifying their URL or other address in the access request). Thus, in response to receipt from a user of a request for a page in the sequence that uniquely identifies the requested page, the user is given access to the identified page regardless of whether or not the user has already accessed the identified page. Optionally, instead of, or in addition to, being used to skip previously-accessed pages in a sequence, the invention may be used to achieve the complementary effect of allowing the user to access only previously-accessed pages in the sequence. This allows the user to more-easily find information which the user knows that he or she has seen before.

These and other advantages and features of the invention will become more apparent from the following detailed description of an illustrative embodiment of the invention considered together with the drawing.

DETAILED DESCRIPTION

Figure 1:
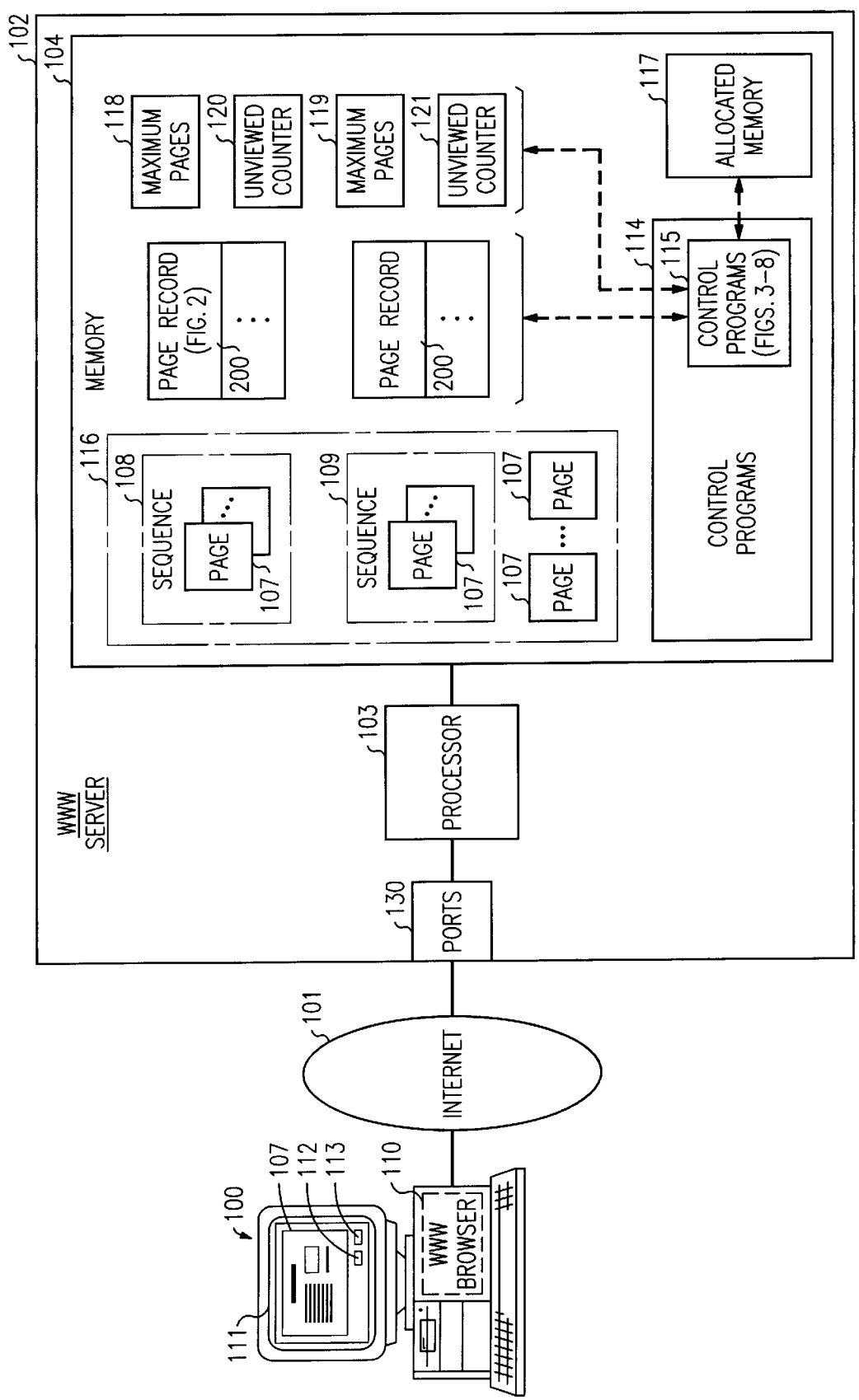
FIG. 1 is a block diagram of an illustrative data-retrieval system that includes an illustrative embodiment of the invention.

FIG. 1 shows a simplified block diagram of the World Wide Web. It comprises end-user terminals, represented by terminal 100, each executing a World Wide Web browser 110, such as a Microsoft® Internet Explorer or a Netscape® Navigator, and interconnected by a communications network, represented by the Internet 101, with World Wide Web servers, represented by server 102. A user uses terminal 100 and browser 110 to request and obtain pages 107 of information from server 102, which are then displayed to the user on a display 111 of terminal 100. Also displayed on display 111 by browser 110 along with each page 107 are a "Next Page" virtual button 112 and a "Previous Page" virtual button 113. Server 102 is a stored-program-controlled apparatus that includes communications ports 130 for interfacing server 102 to Internet 101, a processor 103, and a memory 104 that stores control programs 114 for execution by processor 103 and data (pages 107 of information) for access by users. Memory 104 may comprise any number and types of storage units, both on-line and off-line. As described so far, the World Wide Web of FIG. 1 is conventional. For purposes of this invention, the World Wide Web may be replaced by any electronic data-retrieval system, and the pages may be replaced by any addressable data entities. Moreover, the server and the browser may even be co-located on the same computer.

According to the invention, included among data 116 and programs 114 stored in memory 104 of server 102 are page records 200 and control programs 115 which implement the invention in the World Wide Web of FIG. 1.

Figure 2:
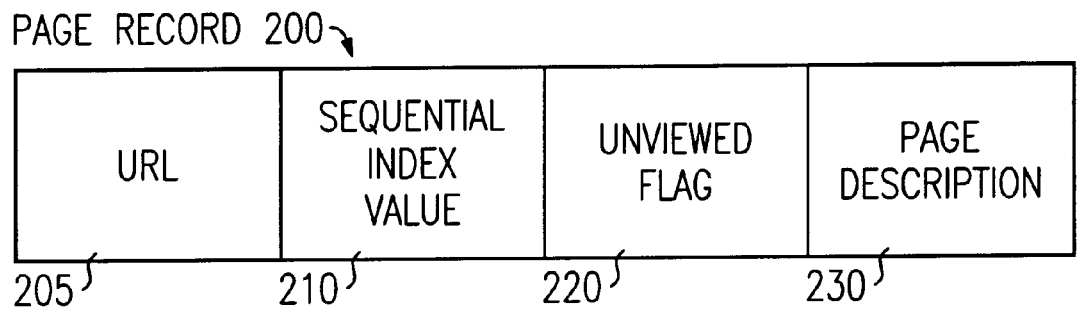
FIG. 2 is a block diagram of a page record of a server of the system of FIG. 1.

An illustrative page record 200 is shown in FIG. 2. One record 200 exists for each page 107 that is included in a sequence 108 or 109 with other pages 107 (as opposed to being a stand-along page 107 that is not a part of any sequence of pages). Record 200 includes a Universal Resource Locator (URL) field 205 which stores an identifier (e.g., the URL or some other address) of the corresponding page 107. Record 200 also includes a sequential index value field 210 which stores the sequential index value of the corresponding page 107 in a sequence 108 or 109 of pages. The sequential index value indicates the position of the page in the sequence 108 or 109 of pages relative to the positions of the other pages 107 in that sequence. While it is sufficient that the sequential index values be ordinal (i.e., monotonically increasing or decreasing) in the sequence, for ease of illustration this discussion assumes that the index values are truly sequential, i.e., the difference between the index values of any two pages 107 in the sequence is one. Record 200 further includes an unviewed flag field 220 whose state indicates whether or not the corresponding page 107 has been accessed (viewed) by the user during the present session. Optionally, record 200 also includes a page description field 230, which can contain any supplemental information that the owner of page 107 wishes to associate therewith.

Figure 3:
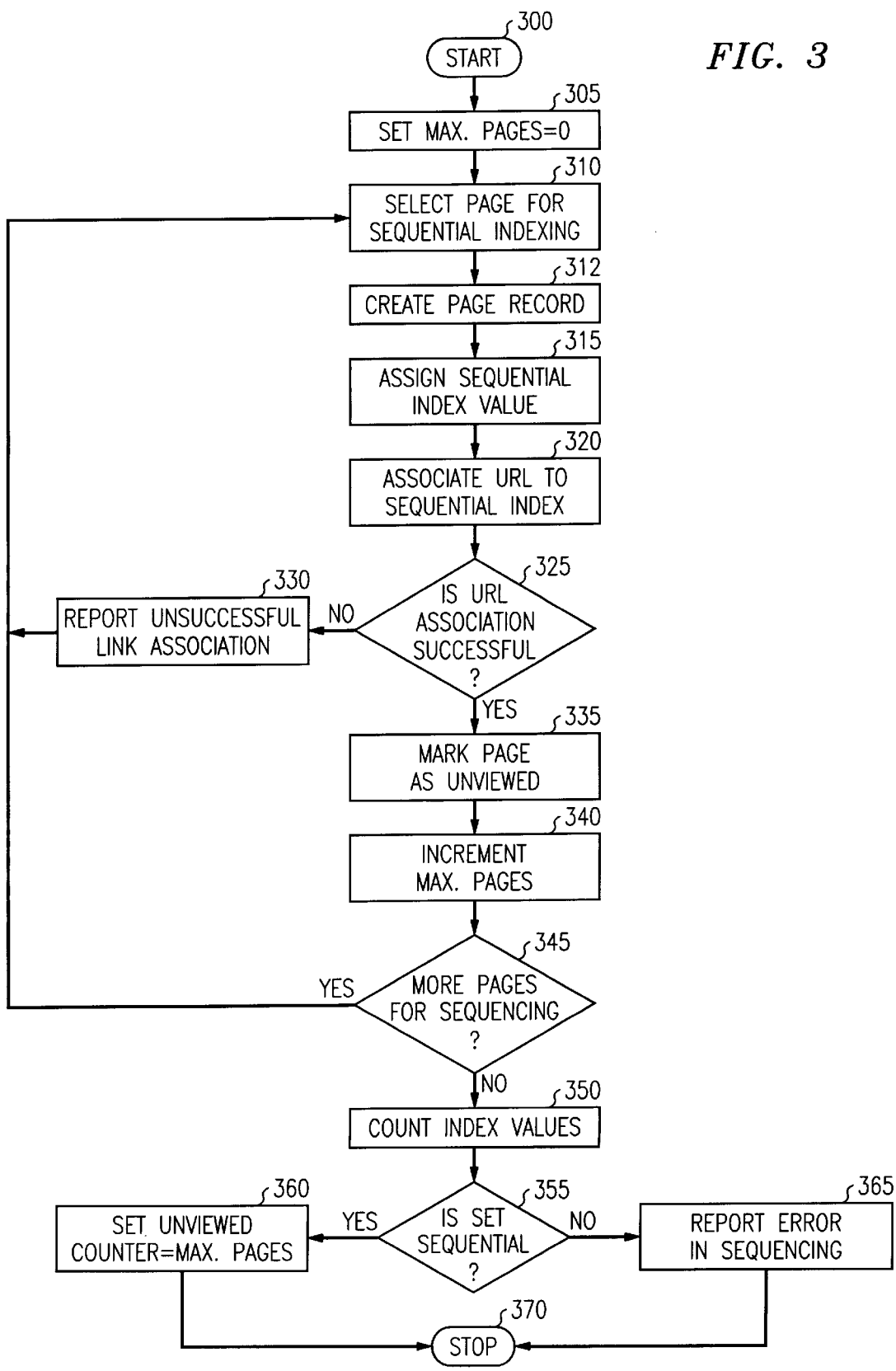
FIG. 3 is a flowchart of a page-sequence definition process of the server of the system of FIG. 1.

FIG. 3 shows the definition process which the author of pages 107 uses to define a sequence 108 or 109 of pages 107 and records 200 of pages 107 in the sequence. Upon invoking execution of a definition program from control programs 115, at step 300, processor 103 sets a variable MAX_PAGES 118 or 119 to zero, at step 305. When the author selects and identifies to processor 103 a page 107 (initially the page 107 that is to be the first page in sequence 108 or 109) for sequential indexing, at step 310, processor 103 creates a page record 200 for that page 107, at step 312, and assigns a sequential index value—illustratively the present value of the MAX_PAGES variable 118 or 119—to that page 107 by storing the sequential index value in field 210 of record 200 of that page 107, at step 315. Processor 103 also associates the URL of that page 107 with the sequential index value by storing the URL in field 205 of record 200 of that page 107, at step 320. Processor 103 then checks whether the URL association was successful, e.g., that a page actually exists at the location specified in the URL and that it is accessible, at step 325. If the processor 103 finds that the URL association was not successful, it reports that fact to the author, at step 330, and returns to step 310 et seq. to await the author's next page selection. If processor 103 finds at step 325 that the URL association was successful, it marks the subject page 107 as unviewed by setting flag field 220 of record 200 of that page 107 to the unviewed state, at step 335. Processor 103 then increments the value of the MAX_PAGES variable 108 or 109, at step 340, and checks whether there are more pages 107 to be included in the sequence 108 or 109, at step 345. Illustratively, processor 103 makes this determination by asking the author. If there are more pages 107 to be sequenced, processor 103 returns to steps 310 et seq. to await the author's next page selection. If there are no more pages 107 to be sequenced, processor examines the values of sequential index value field 210 of records 200 of all of the pages 107 that have been placed in the sequence 108 or 109, at step 350, to determine if these values are sequential, at step 355. If they are not sequential, processor 103 reports a sequencing error to the author, at step 365, and ends execution of the definition program, at step 370. If the values are sequential, processor 103 sets the value of an UNVIEWED_COUNTER variable 120 or 121 to the present value of the MAX_PAGES variable 118 or 119, at step 360, and then ends execution of the definition program, at step 370. The value of both the MAX_PAGES variable 118 or 119 and the UNVIEWED_COUNTER variable 120 or 121 are saved in non-volatile memory 104 (e.g., disk memory) in correspondence with the just-created sequence 108 or 109 of pages 107.

Figure 4:
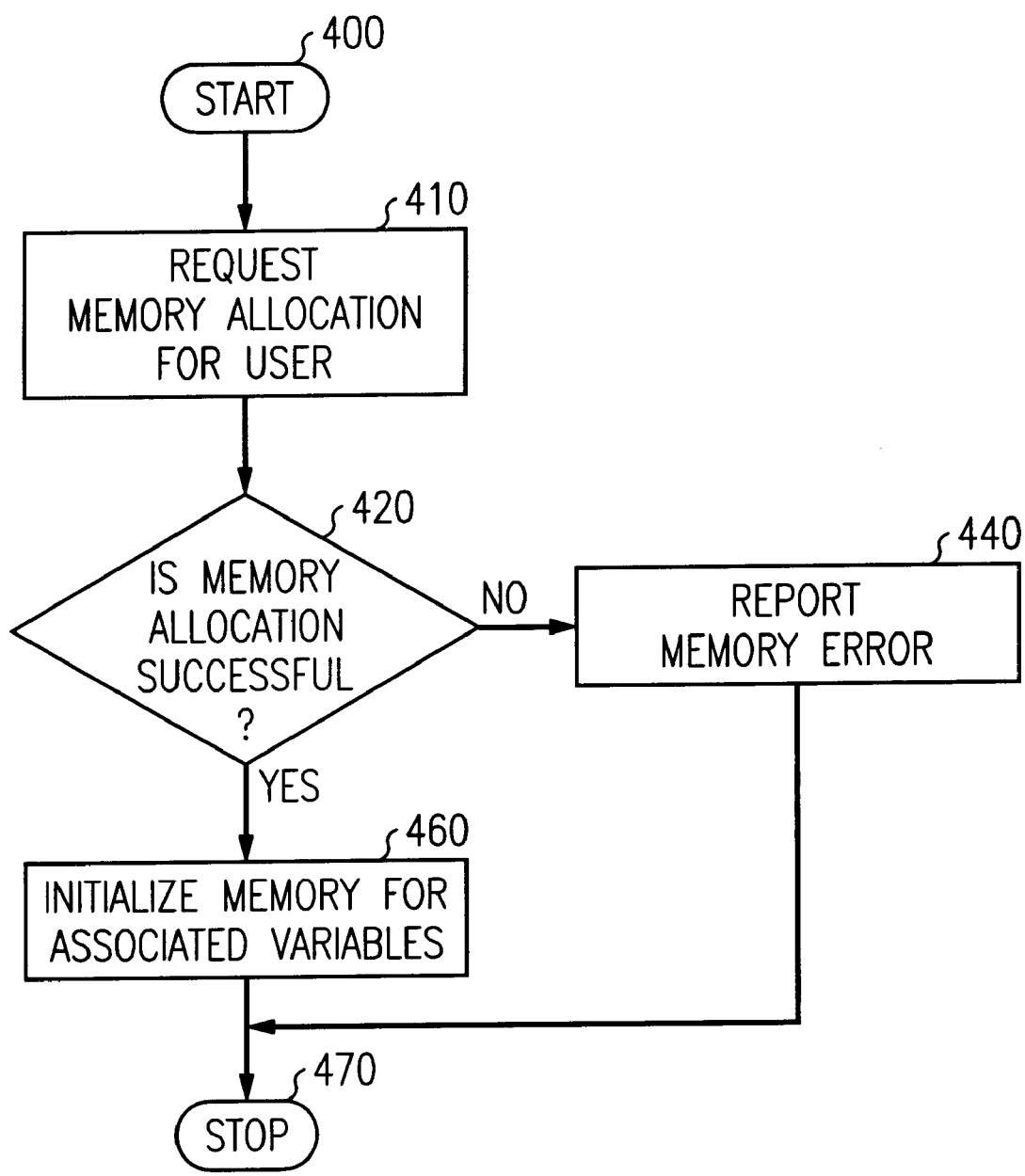
FIG. 4 is a flowchart of a session-establishment process of the server of the system of FIG. 1.

FIG. 4 shows a session-establishment process which is performed each time that a user begins a session with server 102. When a user first accesses server 102 (i.e., server 102 receives a request for a page 107 from a new user), processor 103 begins execution of a session-establishment program from control programs 115, at step 400. Processor 103 effects allocation of memory space 117 in memory 104 for use by the user, in a conventional manner, at step 410, and checks whether the allocation succeeded, at step 420. If memory 117 allocation failed, processor 103 reports that fact, at step 440, and then ends execution of the session-establishment process, at step 470. If memory 117 allocation succeeded, processor 103 initializes the allocated memory 117 for variables associated with this session, at step 460. Inter alia, this involves making and loading a copy of records 200 of all pages 107 and values of UNVIEWED_COUNTER and MAX_PAGES variables 118–121 of all sequences 108–109 that are stored in server 102 into allocated memory 117. This copy and not the originals will be used by processor 103 to service the user's page-access requests. Optionally, processor 103 may also place the corresponding pages 107 in a cache memory. Processor 103 then ends execution of the session-establishment program, at step 470.

Figure 5:
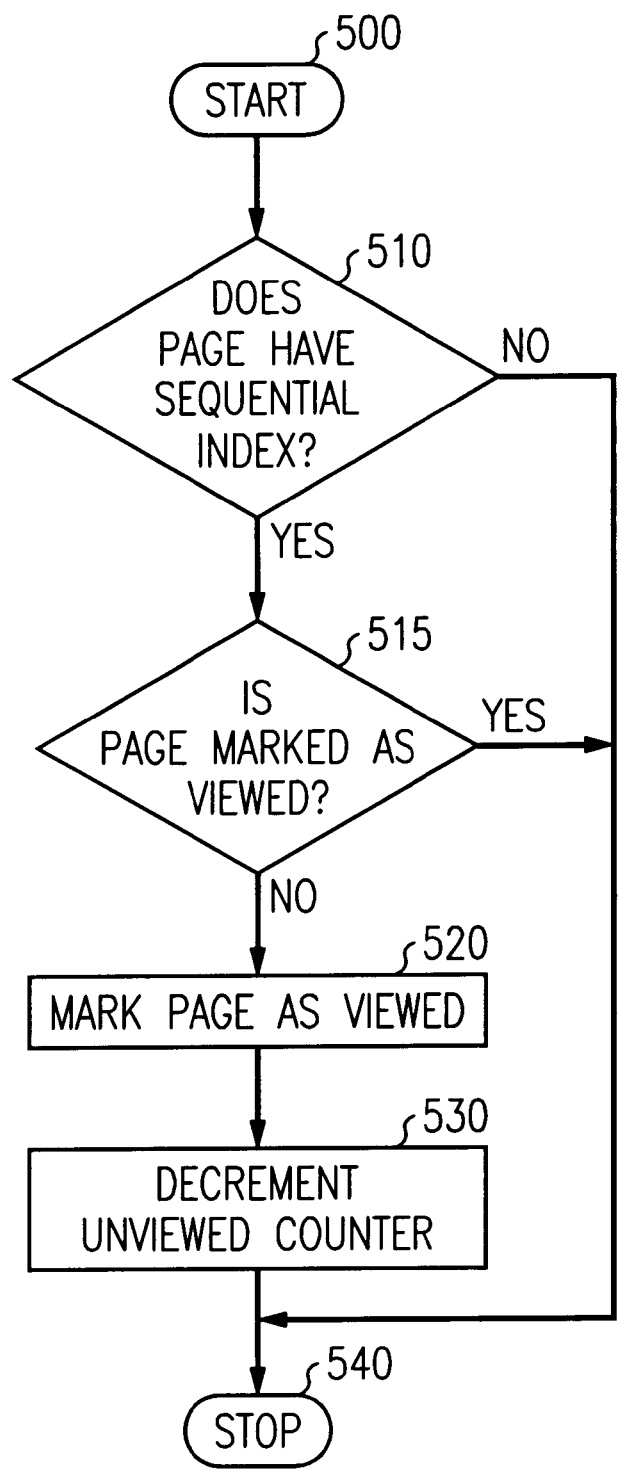
FIG. 5 is a flowchart of a page-viewing process of the server of the system of FIG. 1.

FIG. 5 shows a page-viewing process which is performed each time that a user requests a page 107 by specifying its URL. Receipt of such a request at server 102 invokes execution of a page-viewing program from control programs 115 by processor 103, at step 500. Processor 103 checks whether a record 200 that corresponds to the received URL exists, and if so, if it has a value in sequential index value field 210, at step 510. If record 200 does not exist or index value field 210 is empty, execution of the page-viewing program ends, at step 540, and server 102 proceeds to process the request in a conventional manner. If a record 200 corresponding to the received URL exists and has a value in sequential index value field 210, processor 103 checks unviewed flag field 220 of the copy of that record in the user's allocated memory 117 to determine if that page 107 is marked as having already been viewed by this user, at step 515. If it is marked as viewed, processor proceeds to step 540. If it is not marked as viewed, processor 103 sets the value of field 220 of the copy of that record 200 in the user's allocated memory 117 to indicate that the corresponding page 107 is being viewed by this user, at step 520, and also decrements the value of the page's corresponding copy—if any—of UNVIEWED_COUNTER variable 120 or 121 in the user's allocated memory, at step 530. Processor 103 then proceeds to step 540. In either case, the user is given access to the requested page 107 regardless of whether or not the user has already viewed that page.

Figure 6A:
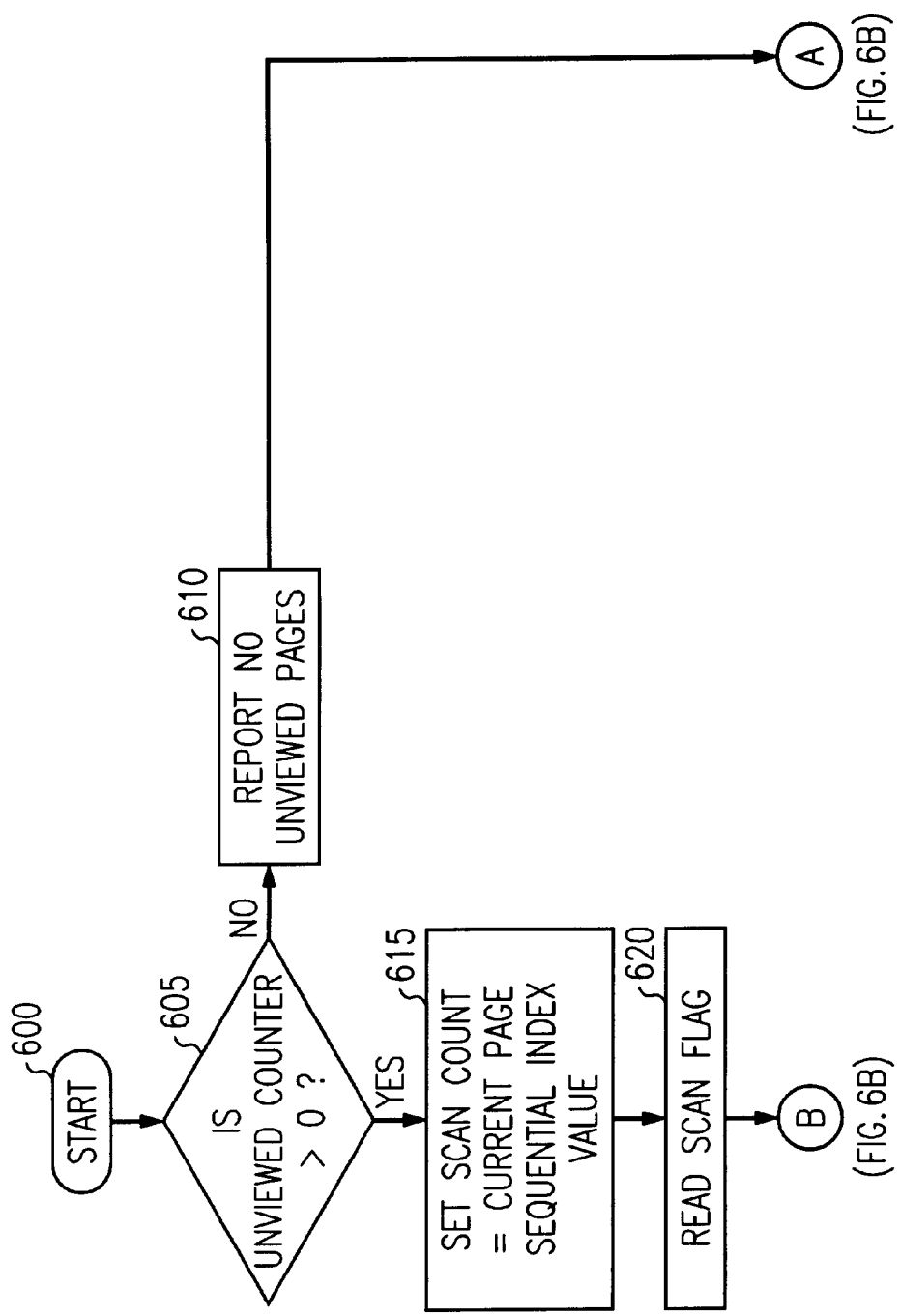
FIGS. 6A and 6B are a flowchart of a "Next Page" activation process of the server of the system of FIG. 1.
Figure 6B:
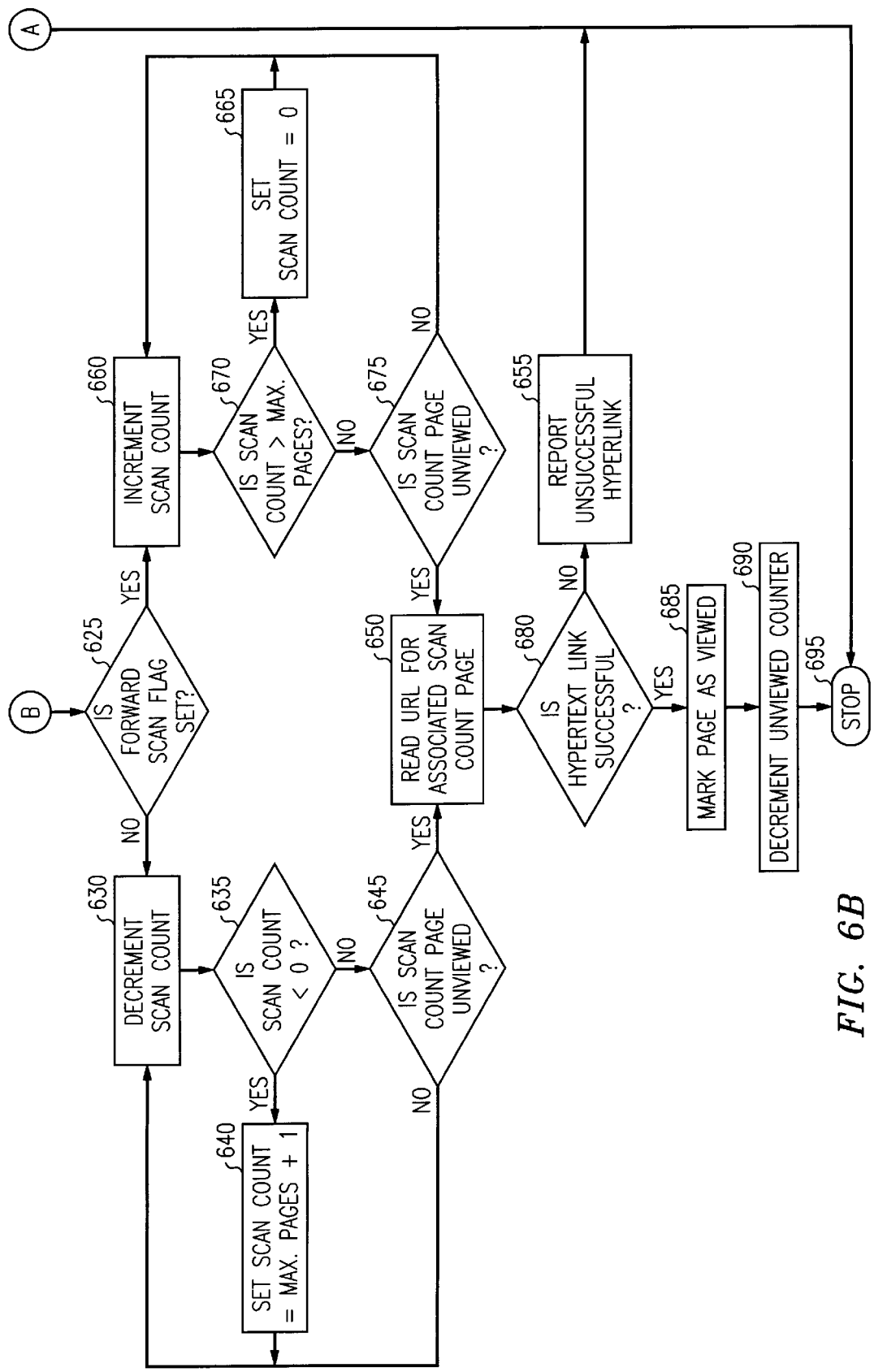

FIGS. 6A and 6B show a "Next Page" activation process which is performed each time that an existing user requests a page 107 by pressing either "Next Page" virtual button 112 or "Previous Page" virtual button 113. Receipt of such a request at server 102 invokes execution of the "Next Unviewed Page" activation program from control programs 115 by processor 103, at step 600. Processor 103 first checks in the contents of the user's allocated memory 117 whether the copy of any UNVIEWED_COUNTER variable 120 or 121 that corresponds to the presently-viewed page 107 (i.e., the page 107 accessed by the user before receipt of the "Next Unviewed Page" or "Previous Unviewed Page" request) has a value greater than zero, at step 605. If not, processor 103 reports to the user that there are no unviewed pages left, at step 610, and ends execution of the "Next Unviewed Page" activation program, at step 695. If any such corresponding non-zero UNVIEWED_COUNTER is variable 120 or 121 is found at step 605, processor 103 sets the value of SCAN_COUNT variable to the value of sequential index value field 210 of the presently-viewed page 107, at step 615. Processor 103 then reads the value of a SCAN_FLAG variable which indicates whether the "Next Page" button 112 or the "Previous Page" button 113 was pressed, at step 620, and determines whether a forward or a backward scan within the presently-scanned sequence 108 or 109 is being requested, at step 625.

If the request is for a forward scan, processor 103 increments the value of the SCAN_COUNT variable, at step 660, and then checks whether this value exceeds the value of the user's copy of the MAX_PAGES variable 118 or 119 that corresponds to this sequence 108 or 109, at step 670. If the SCAN_COUNT value exceeds the value of the MAX_PAGES variable 118 or 119, processor 103 sets the value of SCAN_COUNT to zero, thereby wrapping around from the end to the beginning of the sequence 108 or 109, at step 665, and returns to step 660. If the SCAN_COUNT value does not exceed the value of the MAX_PAGES variable 118 or 119, processor 103 checks whether the user's copy of record 200 whose sequential index value 210 equals the SCAN_COUNT value indicates in its field 220 that this page 107 has not been viewed by the user, at step 675. If this page 107 has been viewed, processor 103 returns to step 660. If this page 107 has not been viewed, processor 103 proceeds to step 650.

Returning to step 625, if it is there determined that the request is for a backward scan, processor 103 decrements the value of the SCAN_COUNT variable, at step 630, and then checks whether this variable's value is less than zero, at step 635. If so, processor 103 sets the value of SCAN_COUNT to an incremented value of the user's copy of the MAX_PAGES variable 118 or 119 that corresponds to this sequence 108 or 109, at step 640, thereby wrapping around from the beginning to the end of the sequence 108 or 109, and returns to step 630. If the SCAN_COUNT value is not less than zero, processor 103 checks whether the user's copy of record 200 whose sequential index value 210 equals the SCAN_COUNT value indicates in its field 220 that this page 107 has not been viewed by the user, at step 645. If this page 107 has been viewed, processor 103 returns to step 630. If this page 107 has not been viewed, processor 103 proceeds to step 650.

At step 650, processor 103 reads the address of page 107 from the URL field 205 of its record 200, at step 650, and checks whether the hypertext link was successful, e.g., whether it is able to retrieve a page-server acknowledgment or a cache acknowledgment, at step 680. If the hypertext link was not successful, processor 103 reports it to the user, at step 655, and proceeds to step 695. If the hypertext link was successful, processor 103 marks the subject page 107 as viewed, by setting flag 220 of the user's copy of its record 200 to the viewed state, at step 685. Processor 103 then decrements the user's copy of the corresponding UNVIEWED_COUNTER variable 120 or 121, at step 690, and proceeds to step 695. After execution of the "Next Unviewed Page" activation program ends, at step 695, serving the user's request continues in the conventional manner.

Figure 7:
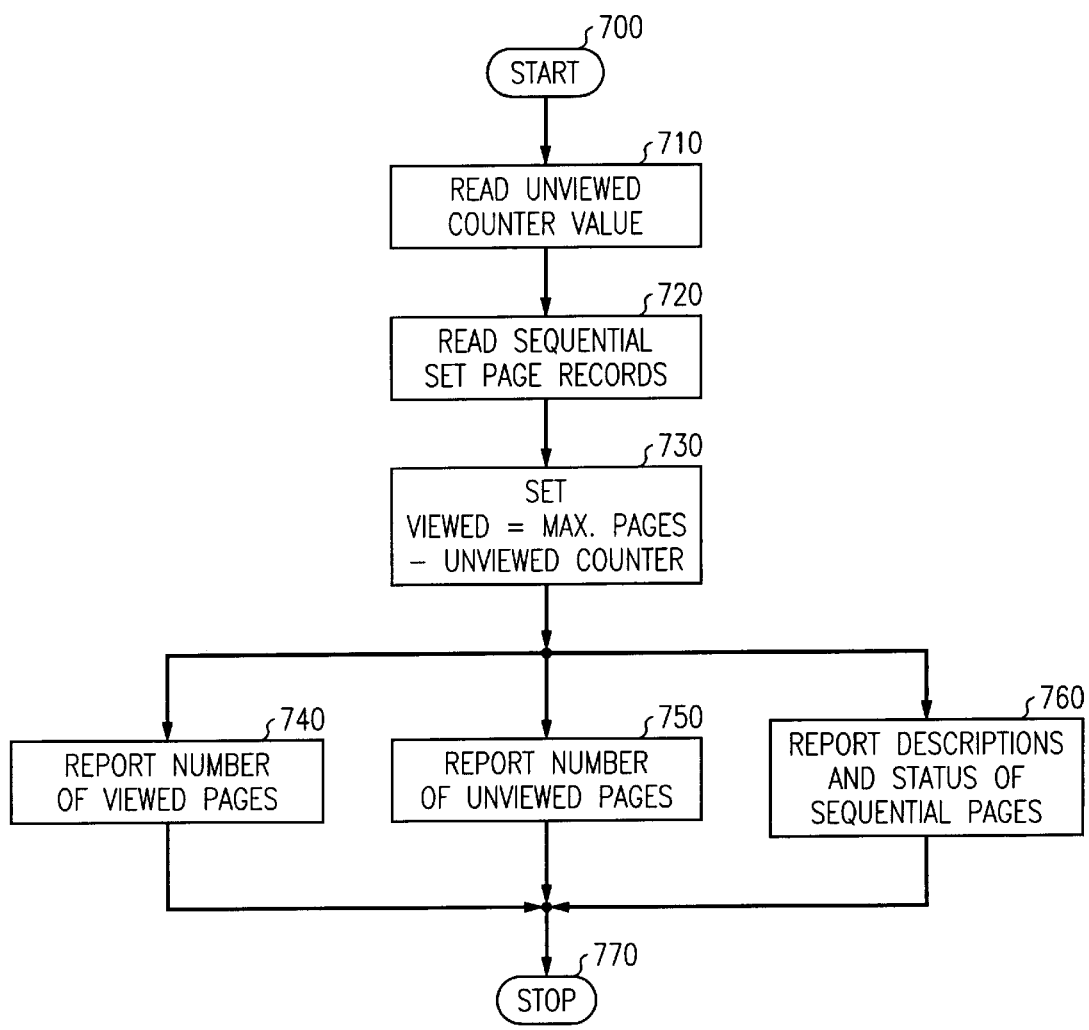
FIG. 7 is a flowchart of a status-reporting process of the server of the system of FIG. 1.

FIG. 7 shows a status-reporting process which is performed whenever the user requests status from server 102. Receipt of the status request at server 102 invokes execution of the status-reporting program from control programs 115 by processor 103, at step 700. Processor 103 reads from the user's allocated memory 117 the value of UNVIEWED_COUNTER variable 120 or 121 which corresponds to whatever page sequence 108 or 109 is presently being accessed by the user, at step 710. Processor 103 also examines the unviewed flag field 220 of copies of records 200 in the user's allocated memory 117 of all pages 107 in the page sequence 108 or 109 being accessed by the user, to determine how many are marked as unviewed by the user, at step 720. Processor 103 then uses this number and the value of the MAX_PAGES variable 118 or 119 corresponding to the subject page sequence 108 or 109 to determine the number of viewed pages 107 in the sequence 108 or 109, at step 730. Processor 103 then reports to the user the number of viewed pages 107, at step 740, the number of unviewed pages 107, at step 750, plus any information gleaned from page description field 230 of records 200 of pages 107 in this sequence 108 or 109, at step 760. Execution of the status-reporting program then ends, at step 770.

Figure 8:
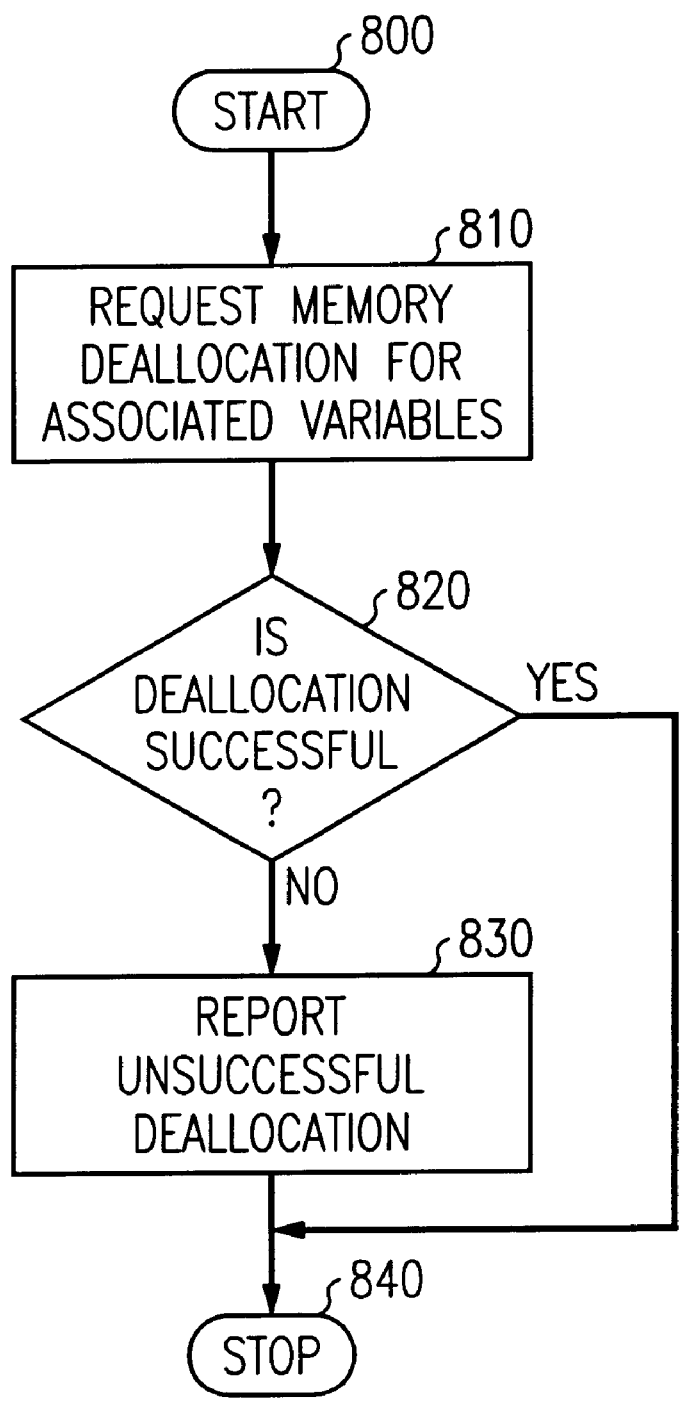
FIG. 8 is a flowchart of a session-termination process of the server of the system of FIG. 1.

FIG. 8 shows a session-termination process which is performed each time that a user ends a session with server 102. When a user terminates the session, e.g., logs off or exits the browser, processor 103 begins execution of a session-termination program from control programs 115, at step 800. Processor 103 effects deallocation of memory 117 from the user, in a conventional manner, at step 810, and checks whether the deallocation succeeded, at step 820. If memory 117 deallocation failed, processor 103 reports that fact, at step 830. If memory 117 deallocation succeeded, or following step 830, processor ends execution of the session-termination process, at step 840.

Of course, various changes and modifications to the illustrative embodiment described above will be apparent to those skilled in the art. For example, the pages need not be textual, but may be graphical, video, and/or audio in nature. Also, the sequence-traversal functions may be executed locally on terminal 100 instead of on server 102, or they may be executed from cache memory. Furthermore, the same principles may be applied to accessing of a sequence of page segments, or to accessing of previously-viewed (as opposed to previously unviewed) pages. Such changes and modifications can be made without departing from the spirit and the scope of the invention and without diminishing its attendant advantages. It is therefore intended that such changes and modifications be covered by the following claims.

What is claimed is:

1. A method of browsing through an ordered sequence of a plurality of pages of information, comprising:

receiving a request from a user for a next page in the sequence while the user is accessing an individual page in the sequence; and in response to the request, skipping over and not giving the user access to previously-accessed pages subsequent in the sequence to the individual page and giving the user access to a first page, subsequent in the sequence to the individual page, that has not yet been accessed by the user.

2. The method of claim 1 further comprising:

receiving a second request from the user for a previous page in the sequence while the user is accessing the individual page; and in response to the second request, giving the user access to a first page, preceding the individual page in the sequence, that has not yet been accessed by the user.

3. The method of claim 1 further comprising:

receiving a second request from the user for a page in the sequence which page is uniquely identified in the request; and in response to the second request, giving the user access to the identified page regardless of whether or not the user has already accessed the identified page.

4. The method of claim 2 further comprising:

receiving a third request from the user; and in response to the third request, reporting to the user how many pages in the sequence have already been accessed by the user and how many pages in the sequence have not yet been accessed by the user.

5. The method of claim 4 wherein:

at least some of the pages in the sequence have corresponding stored descriptions associated therewith, and the step of reporting further comprises the step of reporting to the user any corresponding stored descriptions associated with the pages in the sequence.

6. A method of browsing through an ordered sequence of a plurality of pages of information, comprising:

in response to receiving a request from a user to access a next page in the sequence while the user is accessing an individual page in the sequence, determining whether the user has already accessed a second page that is adjacent to the individual page in the sequence;

in response to determining that the user has not yet accessed the second page, giving the user access to the second page;

in response to determining that the user has already accessed the second page, forbearing from giving the user access to the second page and determining whether the user has already accessed a third page, other than the individual page, that is adjacent to the second page in the sequence; and in response to determining that the user has not yet accessed the third page, giving the user access to the third page.

7. The method of claim 6 further comprising:

in response to determining that the user has already accessed the third page, giving the user access to a first page that follows the third page in the sequence and that has not yet been accessed by the user.

8. A method of browsing through an ordered sequence of a plurality of pages of information, comprising:

for each page in the sequence, creating a page record comprising and identifier of the page, an indicator of a position of the page in the sequence relative to positions of other said pages in the sequence, and an indicator of whether or not the page has been accessed and presently indicating that the page has not been accessed;

in response to the user's each request to access a particular page in the sequence by specifying the identifier of the particular page, causing the accessed indicator of the record of the particular page to indicate that the particular page has been accessed, and giving the user access to the particular page;

in response to the user's each request to access a next page in the sequence while the user is accessing an individual page in the sequence, using the position indicators of the record of the individual page and of the record of a first page subsequent in the sequence to the individual page to find the first page;

determining from the accessed indicator of the record of the first page whether the first page has been accessed;

in response to determining that the first page has not been accessed, causing the accessed indicator of the record of the first page to indicate that the first page has been accessed, and giving the user access to the first page;

in response to determining that the first page has been accessed, using the position indicators of the record of the first page and of the record of a second page subsequent in the sequence to the first page to find the second page;

determining from the accessed indicator of the record of the second page whether the second page has been accessed; and in response to determining that the second page has not been accessed, causing the accessed indicator of the record of the second page to indicate that the second page has been accessed, and giving the user access to the first page.

9. The method of claim 8 further comprising:

in response to determining that the second page has been accessed, using the position indicators of the records of the second page and of the records of pages subsequent to the second page in the sequence and the accessed indicators of the records of the pages subsequent to the second page in the sequence to find a third page that is first in the sequence subsequent to the second page to not have already been accessed by the user, and giving the user access to the third page.

10. The method of claim 8 further comprising:

in response to each user's initial request to access the sequence, making a copy of the records of all of the pages in the sequence for that user; and thereafter using that user's copies of the records and not the records themselves to respond to that user's access requests.

11. A method of browsing through an ordered sequence of a plurality of pages of information, comprising:

receiving a request from a user for a next page in the sequence while the user is accessing an individual page in the sequence; and in response to the request, skipping over and not giving the user access to previously-unaccessed pages subsequent in the sequence to the individual page and giving the user access to a first page, subsequent in the sequence to the individual page, that has already been accessed by the user.

12. The method of claim 11 further comprising:

receiving a second request from the user for a previous page in the sequence while the user is accessing the individual page; and in response to the second request, giving the user access to a first page, preceding the individual page in the sequence, that has already been accessed by the user.

13. An apparatus that performs the method of claims 1 or 2 or 3 or 4 or 5 or 6 or 7 or 8 or 9 or 10 or 11 or 12.

14. A computer-readable medium containing software which, when executed in a computer, causes the computer to perform the steps of claim 1 or 2 or 3 or 4 or 5 or 6 or 7 or 8 or 9 or 10 or 11 or 12.

15. An apparatus comprising:

a memory for storing a plurality of pages of information that form an ordered sequence of said pages:

a communications facility that communicates with a user to receive user requests to access the pages and to give the user access to the requested pages; and a processor that responds to receipt of a request from the user for a next page in the sequence while the user is accessing an individual page in the sequence, by skipping over and not giving the user access to previously-accessed pages subsequent in the sequence to the individual page and giving the user access to a first page, subsequent in the sequence to the individual page, that has not yet been accessed by the user.

16. The apparatus of claim 15 wherein:

the processor further responds to receipt of a second request from the user for a previous page in the sequence while the user is accessing the individual page, by giving the user access to a first page, preceding the individual page in the sequence, that has not yet been accessed by the user.

17. The apparatus of claim 16 wherein:

the processor further responds to receipt of a third request from the user for a page in the sequence which page is uniquely identified in the request, by giving the user access to the identified page regardless of whether or not the user has already accessed the identified page.

18. An apparatus comprising:

a memory for storing a plurality of pages of information that form an ordered sequence of said pages;

a communications facility that communicates with a user to receive user requests to access the pages and to give the user access to the requested pages; and a processor that responds to receipt of a request from the user for a next page in the sequence while the user is accessing an individual page in the sequence, by skipping over and not giving the user access to previously-unaccessed pages subsequent in the sequence to the individual page and giving the user access to a first page, subsequent in the sequence to the individual page, that has already been accessed by the user.

19. The apparatus of claim 18 wherein:

the processor further responds to receipt of a second request from the user for a previous page in the sequence while the user is accessing the individual page, by giving the user access to a first page, preceding the individual page in the sequence, that has already been accessed by the user.

* * * * *